(12) United States Patent
Wang et al.

(10) Patent No.: US 11,069,228 B2
(45) Date of Patent: Jul. 20, 2021

(54) METHOD FOR TRANSMITTING SIGNAL VIA MESH NETWORK AND REMOTE CONTROL SYSTEM THEREOF

(71) Applicant: Gunitech Corp., Qionlin Township, Hsinchu County (TW)

(72) Inventors: Ming-Yi Wang, Qionlin Township (TW); Xiao-Juan Lin, Qionlin Township (TW); Hsin-Yi Kao, Qionlin Township (TW); Huan-Ruei Shiu, Qionlin Township (TW); Chung-Liang Hsu, Qionlin Township (TW)

(73) Assignee: Gunitech Corp., Qionlin Township (TW)

( * ) Notice: Subject to any disclaimer, the term of this patent is extended or adjusted under 35 U.S.C. 154(b) by 0 days.

(21) Appl. No.: 16/879,878

(22) Filed: May 21, 2020

(65) Prior Publication Data

US 2020/0380857 A1  Dec. 3, 2020

Related U.S. Application Data

(60) Provisional application No. 62/853,206, filed on May 28, 2019.

(51) Int. Cl.
| | |
|---|---|
| *G08C 23/04* | (2006.01) |
| *H04B 10/114* | (2013.01) |
| *H04W 84/12* | (2009.01) |
| *H04W 84/18* | (2009.01) |

(52) U.S. Cl.
CPC ............. *G08C 23/04* (2013.01); *H04W 84/12* (2013.01); *H04W 84/18* (2013.01)

(58) Field of Classification Search
CPC .................... G08C 23/04; H04B 10/114–1143
See application file for complete search history.

(56) References Cited

U.S. PATENT DOCUMENTS 7,668,197 B1 * 2/2010 Vergis ................... G08C 23/04
370/466

* cited by examiner

*Primary Examiner* — Shi K Li
(74) *Attorney, Agent, or Firm* — Karin L. Williams; Alan D. Kamrath; Mayer & Williams PC (57) ABSTRACT

A method for transmitting signal via a mesh network and a remote control system thereof are disclosed. The method comprises the steps of: executing a setting process, including: downloading a first control instruction to a mesh network control device; dividing the first control instruction into a plurality of transmission codes; storing a second control instruction, wherein the second control instruction is part of the first control instruction; transmitting a plurality of transmission codes to an infrared control device via the mesh network environment; and restoring the plurality of transmission codes to the first control instruction and storing the first control instruction; and executing remote control process, including: transmitting the second control instruction to the infrared control device; converting into the first control instruction according to the second control instruction; and controlling the device by using an infrared signal to control a controlled device.

16 Claims, 6 Drawing Sheets

METHOD FOR TRANSMITTING SIGNAL VIA MESH NETWORK AND REMOTE CONTROL SYSTEM THEREOF

BACKGROUND OF THE INVENTION

1. Field of the Invention

The present invention relates to a method for transmitting signal via mesh network and a remote control system thereof, particularly to a method for transmitting signals via mesh network and a remote control system thereof without being affected by the packet length of a mesh network.

2. Description of the Related Art

With the advancement of science and technology, various wireless network applications are booming, and wireless network applications have also been extended to home automation connection methods. In the prior art, traditional infrared, Bluetooth or Wi-Fi connections may be used to control home devices. However, when infrared, Bluetooth or Wi-Fi connections are used for signal transmission, the home devices can only be controlled one-to-one, and the transmission direction or distance is limited, and the remote control signal is not easy to transmit to devices that are too far away.

Therefore, it is necessary to provide a new method for transmitting signal via mesh network and a remote control system thereof remote control system to solve the problem in the prior art.

SUMMARY OF THE INVENTION

It is a primary objective of the present invention to provide a method for transmitting signal via mesh network with an effect of not being affected by the packet length limitation of the mesh network.

It is another objective of the present invention to provide a remote control system used for the method described above.

To achieve the above objectives, a method for transmitting signal via mesh network in the present invention is used for the remote control system to control a controlled device. The remote control system includes a mesh network control device and an infrared control device. The method includes the steps of: executing a setting process, including: downloading a first control instruction to a mesh network control device; dividing the first control instruction into a plurality of transmission codes; storing a second control instruction, wherein the second control instruction is part of the first control instruction; transmitting a plurality of transmission codes to an infrared control device via the mesh network environment; and restoring the plurality of transmission codes to the first control instruction and storing the first control instruction; and executing a remote control process, including: transmitting the second control instruction to the infrared control device; converting into the first control instruction according to the second control instruction; and using the first control instruction to control the device by using an infrared signal to control a controlled device.

The remote control system of the present invention includes a mesh network control device and an infrared control device. The mesh network control device includes a first transmission module, a first processing module, a memory module and a second transmission module. The first transmission module is used to download a first control instruction. The first processing module is electrically connected to the first transmission module for converting the first control instruction into the second control instruction and dividing the transmission codes. The memory module is electrically connected to the first processing module for storing the second control instruction. The second transmission module is electrically connected to the first processing module for transmitting a plurality of transmission codes via a mesh network environment. The infrared control device includes a third transmission module, a second processing module, database and an infrared transmitting module. The third transmission module is used to transmit and receive the plurality of transmission codes via the mesh network environment. The second processing module is electrically connected to the third transmission module for restoring the plurality of transmission codes to the first control instruction. The database is electrically connected to the second processing module for storing the first control instruction. The infrared transmitting module is electrically connected to the second processing module. When the second control instruction is transmitted to the third transmission module from the second transmission module, the second processing module queries the database according to the second control instruction to convert it to the first control instruction. The first control instruction uses the infrared transmitting module to transmit infrared signals to control a controlled device.

DETAILED DESCRIPTION OF THE PREFERRED EMBODIMENT

Hereafter, the technical content of the present invention will be better understood with reference to preferred embodiments.

Figure 1:
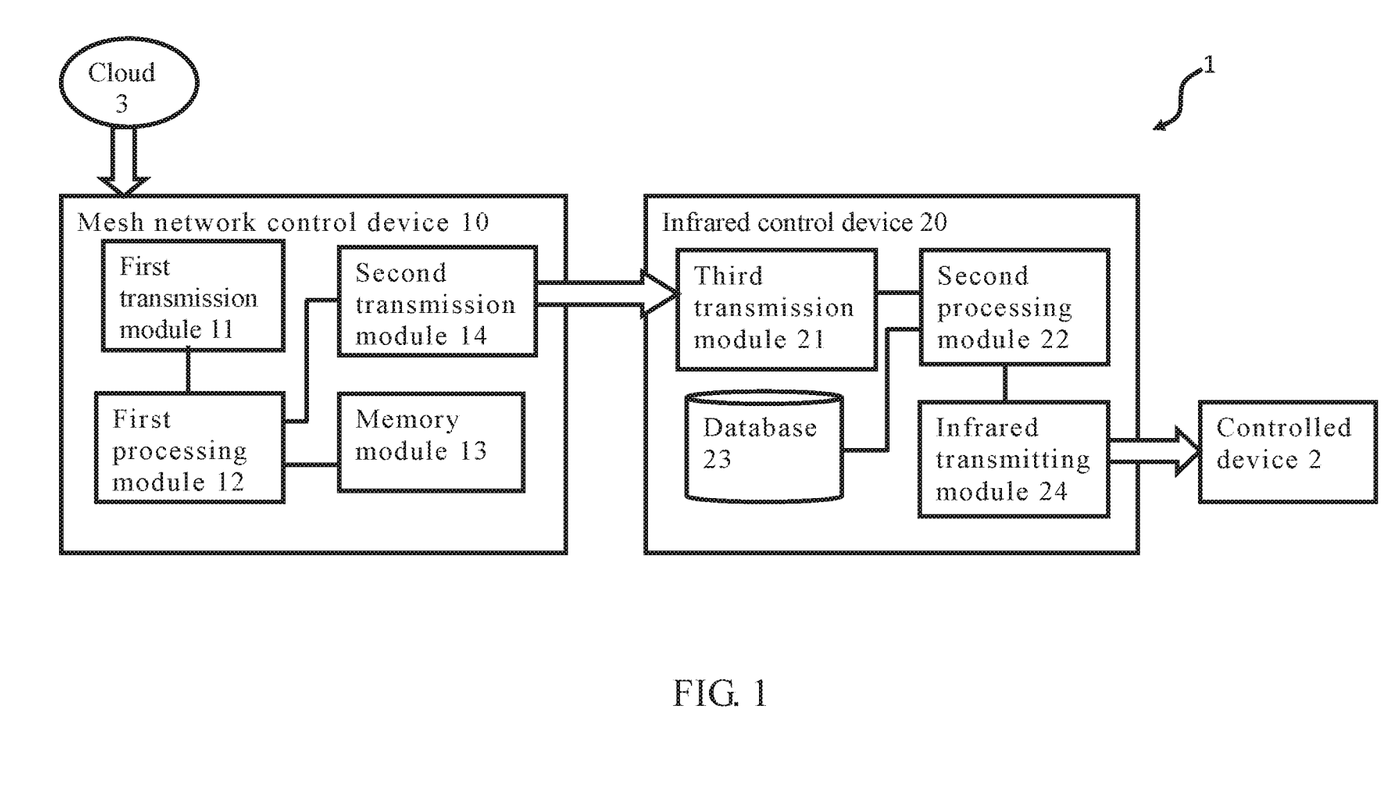
FIG. 1 is an architecture diagram of a remote control system of a first embodiment of the present invention.

Please first refer to FIG. 1, which is an architecture diagram of a remote control system of a first embodiment of the present invention.

A remote control system 1 in the present invention is used in a mesh network environment to transmit control instructions for controlling a controlled device 2, and at last the infrared signal is used to control the controlled device 2. The controlled device 2 may be a general household appliance, as long as a device that can receive infrared signals within the scope of the present invention. The remote control system 1 includes a mesh network control device 10 and an infrared control device 20. The mesh network control device 10 can be a device that can be used in a mesh network environment, such as a portable mobile device or a gateway device, but the present invention is not limited to the above devices.

The mesh network control device 10 includes a first transmission module 11, a first processing module 12, a memory module 13 and a second transmission module 14. The first transmission module 11 has the wireless transmission function, and can be used to download a first control instruction 31 through cloud 3 via a Wi-Fi network environment. Hereafter, please also refer to FIG. 2A, which is a schematic diagram showing the relationship between a first control instruction and transmission codes of the present invention. The first control instruction 31 can include a part of header code 41 and body code 42. The length of the header code 41 can be 12 bytes, and its content can be divided into a plurality of categories, such as appliance number, region, appliance type, brand, code, and function. The body code 42 can be the content of the control code for controlling the controlled device 2. Its length may be between 100 and 200 bytes, but the present invention is not limited to the number listed above.

Figure 2A:
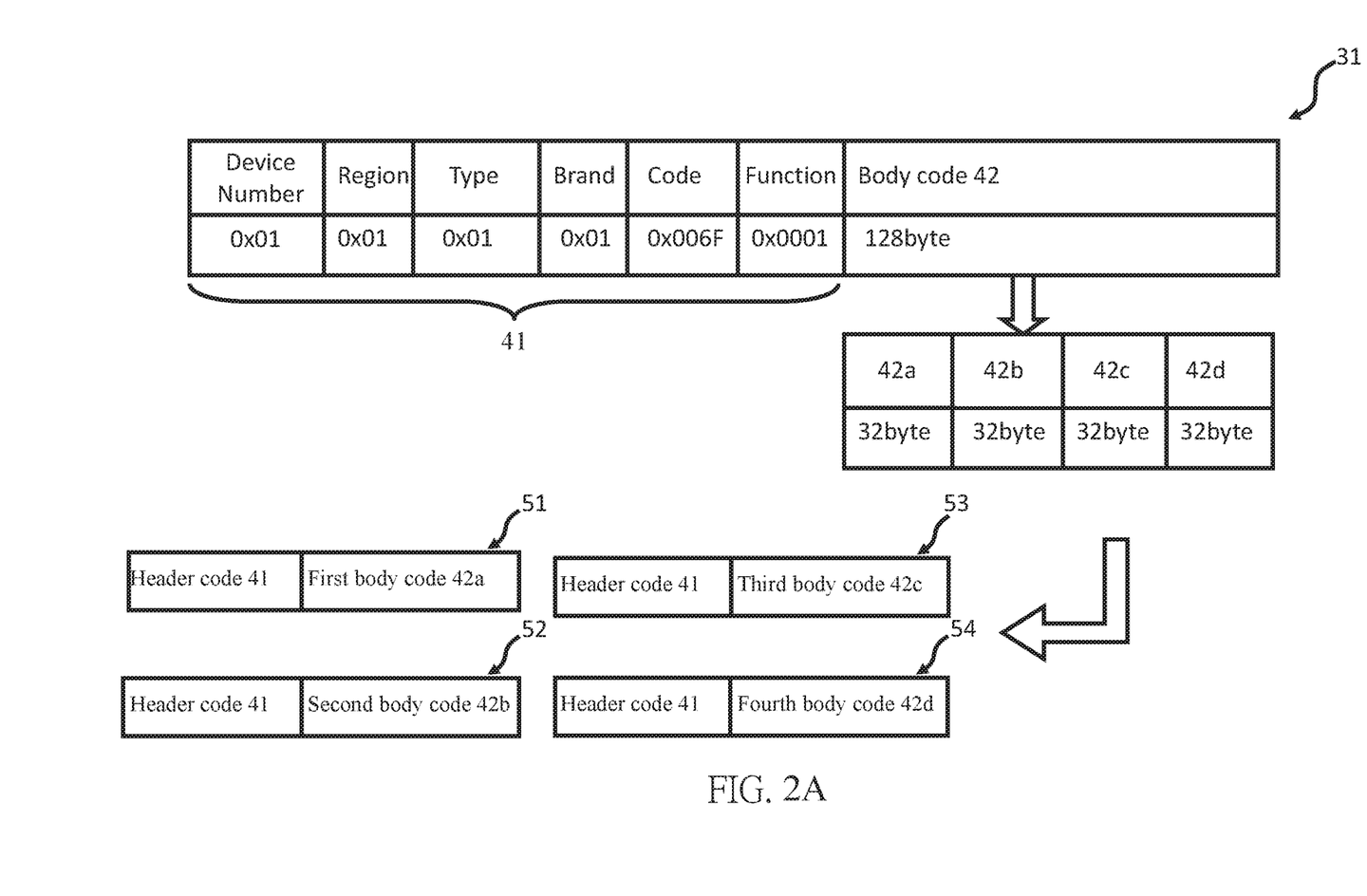
FIG. 2A is a schematic diagram showing the relationship between a first control instruction and transmission codes of the present invention.

The first processing module 12 is electrically connected to the first transmission module 11. After receiving the first control instruction 31, the first processing module 12 is used to divide the first control instruction 31 into a plurality of transmission codes 51, 52, 53, 54. In an embodiment of the present invention, the first processing module 12 divides the body code 42 into four groups, namely a first body code 42a, a second body code 42b, a third body code 42c, and a fourth body code 42d. If the length of the original body code 42 is 128 bytes, the first body code 42a, second body code 42b, third body code 42c, and fourth body code 42d are respectively 32 bytes, but the present is not limited to the above values. Then, the first processing module 12 combines the header code 41 with the first body code 42a, the second body code 42b, the third body code 42c, and the fourth body code 42d, respectively, to generate a plurality of transmission codes 51, 52, 53, 54. Therefore, in this embodiment, the length of each transmission code 51, 52, 53, 54 is 44 bytes, which can meet the requirements for transmitting short packets in the mesh network environment.

Figure 2B:
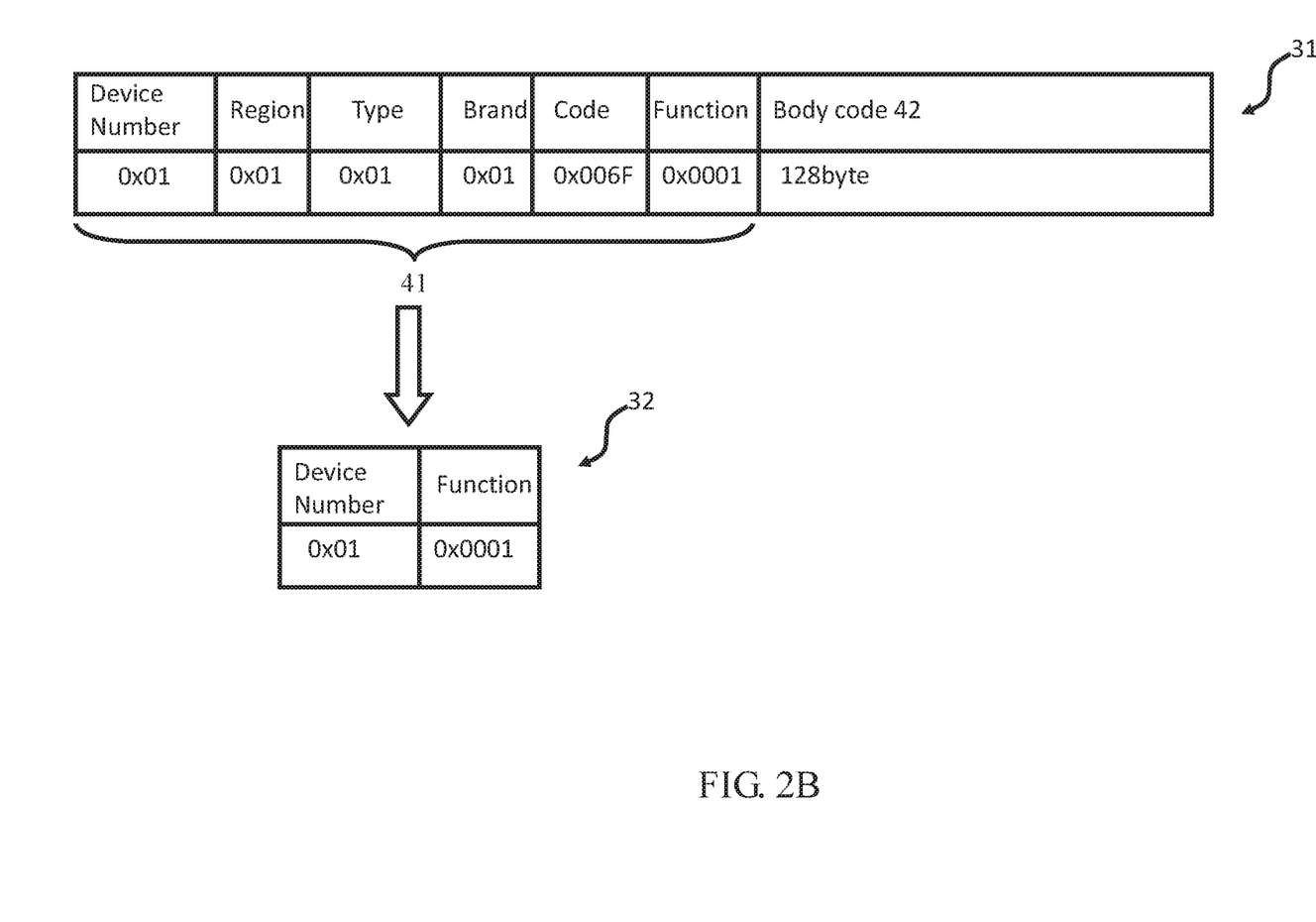
FIG. 2B is a schematic diagram showing the relationship between a first control instruction and a second control instruction of the present invention.

Then, please refer to FIG. 2B, which is a schematic diagram showing the relationship between a first control instruction and a second control instruction of the present invention.

Moreover, in an embodiment of the present invention, the first processing module 12 takes out the appliance number and function code in the first control instruction 31 separately to convert it to the second control instruction 32, such that the second control instruction 32 is part of the first control instruction 31. The length of the second control instruction 32 may be 5 bytes, but the present invention is not limited thereto. The memory module 13 is electrically connected to the first processing module 12 for storing the second control instruction 32. The second transmission module 14 is electrically connected to the processing module. The second transmission module 14 also has the wireless transmission function, but the difference from the first transmission module 11 is that the second transmission module 14 is used in the mesh network environment. Accordingly, the second transmission module 14 transmits the transmission codes 51, 52, 53, 54 to the infrared control device 20 via the mesh network environment.

The infrared control device 20 includes a third transmission module 21, a second processing module 22, a database 23 and an infrared transmitting module 24. The third transmission module 21 is used to transmit the transmission codes 51, 52, 53, 54 received from the second transmission module 14 via the mesh network environment. The second processing module 22 is electrically connected to the third transmission module 21. After the third transmission module 21 receives the transmission codes 51, 52, 53, 54, the second processing module 22 is used to restore the transmission code 51, 52, 53, 54 to the first control instruction 31. That is, a first body code 42a, a second body code 42b, a third body code 42c, and a fourth body code 42d are combined into the original body code 42, and the header code 41 can be restored to the first control instruction 31.

The database 23 is electrically connected to the second processing module 22. After the second processing module 22 restores the first control instruction 31, the database 23 stores the first control instruction 31. At this time, the mesh network control device 10 can continuously transmit other control instructions of the same appliance or control instructions of other appliances, such that the database 23 can store all the control instructions.

The infrared transmitting module 24 is electrically connected to the second processing module 22. When controlling the controlled device 2, the user can operate the mesh network control device 10 to let the second transmission module 14 send out the second control instruction 32. For example, to control the TV to turn on, the mesh network control device 10 will send the second control instruction 32 representing the TV power on function to the third transmission module 21 of infrared control device 20 via the mesh network. At this time, the second processing module 22 will query the database 23 according to the second control instruction 32 to convert the short second control instruction 32 into the long first control instruction 31. Then, the body code 42 in the first control instruction 31 is emitted in an infrared signal by using the infrared transmitting module 24. In this way, as long as the mesh network control device 10 transmits the second control instruction 32 with the short packet, the infrared transmitting module 24 can use the body code 42 in the first control instruction 31 to control the controlled device 2 to meet the requirement for transmitting short packets in the mesh network environment.

It should be noted that, each module of the mesh network control device 10 and the infrared control device 20 can be constructed by various manners such as hardware devices, software programs with hardware devices, and firmware combined with hardware devices. For example, a computer program product can be stored in a computer-readable medium and read and executed to achieve the various functions of the mesh network control device 10 of the present invention, but the present invention is not limited to the above-mentioned manner Additionally, the preferred embodiment of the present invention described here is only illustrative. To avoid redundancy, all the possible combinations of changes are not documented in detail. However, it shall be understood by those skilled in the art that each of the modules or elements described above may not be necessary. For the implementation of the present invention, the present invention may also contain other detailed, conventional modules or elements. Each module or component is likely to be omitted or modified depending on the needs. Other modules or elements may not necessarily exist between two of any modules.

Figure 3:
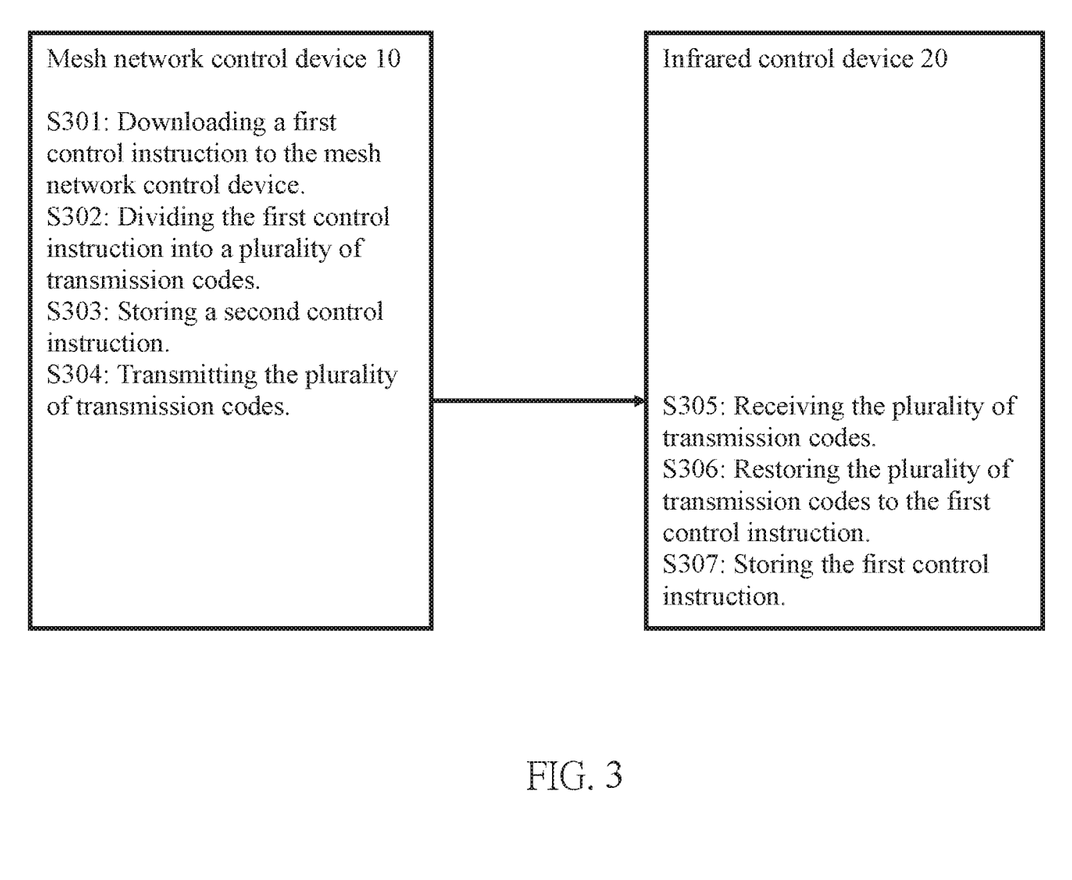
FIG. 3 is a flowchart showing steps for executing a setting process in a method for transmitting signals via a mesh network of the present invention.
Figure 4:
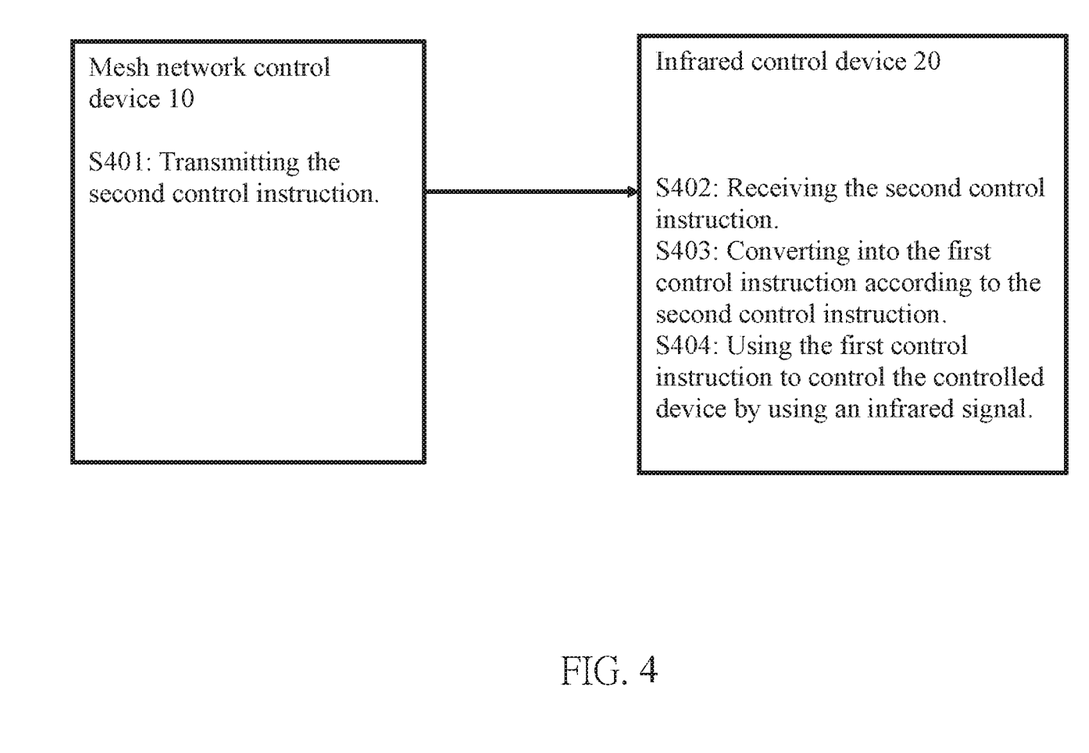
FIG. 4 is a flowchart showing steps for executing a remote control process in a method for transmitting signals via a mesh network of the present invention.

Then, please refer to FIG. 3 and FIG. 4 sequentially. FIG. 3 is a flowchart showing steps for executing a setting process in a method for transmitting signals via a mesh network of the present invention. FIG. 4 is a flowchart showing steps for executing a remote control process in a method for transmitting signals via a mesh network of the present invention.

It should be noted here that although the above remote control system 1 is taken as an example to describe the method for transmitting signal via mesh network in the present invention, the method for transmitting signal via mesh network of the present invention is not limited to the remote control system 1 used in the same structure described above.

In the method for transmitting signal via mesh network of the present invention, a setting process is performed first. That is, a mesh network control device 10 first performs Step S301: Downloading a first control instruction to the mesh network control device.

The first transmission module 11 of the mesh network control device 10 has the wireless transmission function, and can be used to download the first control instruction 31 through cloud 3 via a Wi-Fi network environment.

Next, in Step S302: Dividing the first control instruction into a plurality of transmission codes.

After receiving the first control instruction 31, the first processing module 12 is used to divide the first control instruction 31 into a plurality of transmission codes 51, 52, 53, 54. In an embodiment of the present invention, the first processing module 12 divides the body code 42 into four groups, and combines the header code 41 and the divided body code 42 to generate the transmission codes 51, 52, 53, 54.

Next, in Step S303: Storing a second control instruction.

At this time, the first processing module 12 converts a part of the first control instruction 31 into the second control instruction 32.

Then, in Step S304: Transmitting the plurality of transmission codes.

At this time, the second transmission module 14 transmits the transmission codes 51, 52, 53, 54 to the infrared control device 20 via a mesh network environment.

At the infrared control device 20, performing Step S305: Receiving the plurality of transmission codes.

The third transmission module 21 of the infrared control device 20 is used to transmit the transmission codes 51, 52, 53, 54 transmitted from the second transmission module 14 via the mesh network environment.

Next, in Step S306: Restoring the plurality of transmission codes to the first control instruction.

After the third transmission module 21 receives the transmission codes 51, 52, 53, 54, the second processing module 22 is used to restore the transmission codes 51, 52, 53, 54 to the first control instruction 31. That is, the four groups of divided body code 42 are combined into the original body code 42, and the header code 41 is added to restore to the first control instruction 31.

Finally, in Step S307: Storing the first control instruction.

Finally, the database 23 stores the first control instruction 31. By continuing the above steps S301 to S307, the database 23 can store all the control instructions of the controlled device 2.

Then, please refer to FIG. 4, which is a flowchart of steps for executing the remote control process in a method for transmitting signal via the mesh network in the present invention.

To control the controlled device 2, first performing Step S401: Transmitting the second control instruction.

The user can now operate the mesh network control device 10 to have the second transmission module 14 send out the second control instruction 32.

The infrared control device 20 can perform Step S402: Receiving the second control instruction.

The third transmission module 21 of the infrared control device 20 will receive the second control instruction 32 from the mesh network control device 10.

Next, in Step S403: Converting into the first control instruction according to the second control instruction.

The second processing module 22 queries the database 23 according to the second control instruction 32 to convert the short second control instruction 32 into the long first control instruction 31.

Finally, in Step S404: Using the first control instruction to control the controlled device by using an infrared signal.

Finally, the body code 42 of the first control instruction 31 partially emits an infrared signal through the infrared transmitting module 24. In this way, the body code 42 in the first control instruction 31 can be used to control the controlled device 2.

It should be noted here that the setting process and the remote control process in the method for transmitting signal via mesh network of the present invention is not limited to the above sequence of steps. As long as the purpose of the present invention can be achieved, the order of the above steps can also be changed.

Figure 5:
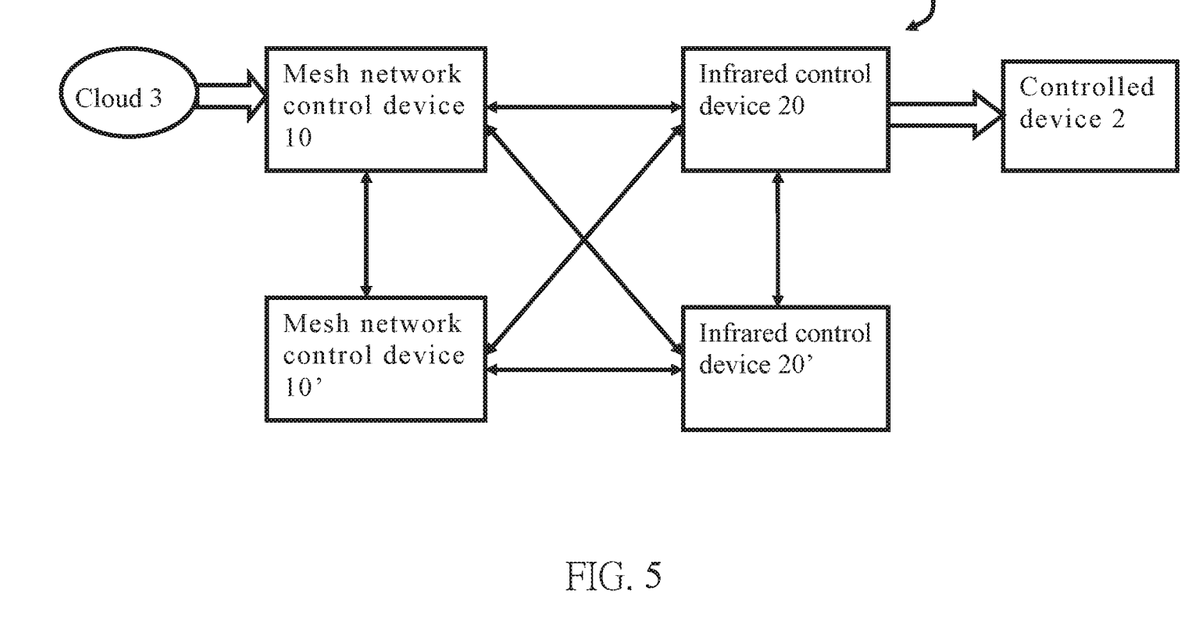
FIG. 5 is an architecture diagram of a remote control system of a second embodiment of the present invention.

Finally, please refer to FIG. 5, is an architecture diagram of a remote control system in a second embodiment of the present invention.

In the second embodiment of the present invention, the mesh network control device 10 and the infrared control device 20 of the remote control system 1' are connected to the other mesh network control device 10'. The other mesh network control device 10' and the mesh network control device 10 may be the same or different devices, but both have the function of transmitting signals in a mesh network environment. In this way, the mesh network control device 10 can first transmit the second control instruction 32 to the other mesh network control device 10'. The transmission method can be Bluetooth, Wi-Fi, or scanning barcode, but it is not limited to the use of mesh network. Then, it is transmitted to the infrared control device 20 from mesh network control device 10' using a mesh network. Moreover, the mesh network control device 10 and the infrared control device 20 can also be connected to the other infrared control device 20'. The infrared control device 20 and the other infrared control device 20' both have the function of transmitting signals in a mesh network environment, as well as the function of transmitting infrared signals. With the mesh network control device 10, the second control instruction can be transmitted to the other infrared control device 20' via the mesh network, and then transmitted to the infrared control device 20 via the mesh network. Also, the second control instruction 32 set in the mesh network control device 10 can be stored in the other mesh network control device 10', and the first control instruction 31 can be stored in the other infrared control device 20'. Through the signal transmission between the different devices mentioned above, the distance that can be controlled by remote controlled device 2 can be extended.

With the method for transmitting signal via mesh network and the remote control system 1 in the present invention, the remote controlled device 2 can be remotely controlled via the mesh network environment without being limited by the packet length of the mesh network.

As described above, the objective, means, and efficiency of the present invention are all different from conventional characteristics in the prior art. It will be appreciated if the committee can review and grant a patent to benefit the society. However, it should be noted that the embodiments of the present invention described above are only illustrative. All without departing from the scope of the invention are defined solely by the appended claims.

What is claimed is:

1. A method for transmitting signals via a mesh network, which is used for a remote control system to control a controlled device, wherein the remote control system comprising a mesh network control device and an infrared control device, the method comprising the steps of:
    executing a setting process, comprising:
        downloading a first control instruction to a mesh network control device;
        dividing the first control instruction into a plurality of transmission codes;
        storing a second control instruction, wherein the second control instruction is part of the first control instruction;
        transmitting the plurality of transmission codes to the infrared control device via a mesh network environment; and
        restoring the plurality of transmission codes to the first control instruction and storing the first control instruction; and
    executing a remote control process, comprising:
        transmitting the second control instruction to the infrared control device;
        let the infrared control device to convert into the first control instruction according to the second control instruction; and
        using the first control instruction to control the device by using an infrared signal to control a controlled device.

2. The method for transmitting signal via the mesh network as claimed in claim 1, further comprising the step of:
    downloading the first control instruction to the mesh network control device via a Wi-Fi network environment.

3. The method for transmitting signal via the mesh network as claimed in claim 1, wherein the first control instruction including a header code and a body code, the method further comprising the step of:
    after dividing the body code, using the header code and the divided body code to generate the plurality of transmission codes.

4. The method for transmitting signal via the mesh network as claimed in claim 3, further comprising the step of:
    setting the second control instruction including a part of the header code.

5. The method for transmitting signal via the mesh network as claimed in claim 1, further comprising the step of:
    transmitting the second control instruction to an other mesh network control device and then to the infrared control device.

6. The method for transmitting signal via the mesh network as claimed in claim 5, further comprising the step of:
    storing the second control instruction to the other mesh network control device.

7. The method for transmitting signal via the mesh network as claimed in claim 1, further comprising the step of:
    transmitting the second control instruction to an other infrared control device and then to the infrared control device.

8. The method for transmitting signal via the mesh network as claimed in claim 7, further comprising the step of:
    storing the first control instruction to the other infrared control device.

9. A remote control system, used in a mesh network environment to control a controlled device, the remote control system comprising:
    a mesh network control device, comprising:
        a first transmission module, which is used to download a first control instruction;
        a first processing module, which is electrically connected to the first transmission module for converting the first control instruction into a second control instruction and dividing into a plurality of transmission codes;
        a memory module, which is electrically connected to the first processing module for storing the second control instruction; and
        a second transmission module, which is electrically connected to the first processing module for transmitting the transmission codes via the mesh network environment; and
    an infrared control device, comprising:
        a third transmission module, which is used to transmit and receive the transmission codes via the mesh network environment;
        a second processing module, which is electrically connected to the third transmission module for restoring the transmission codes to the first control instruction;
        a database, which is electrically connected to the second processing module for storing the first control instruction; and
        an infrared transmitting module, which is electrically connected to the second processing module; when the second transmission module transmits the second control instruction to the third transmission module, the second processing module queries the database according to the second control instruction to convert it to the first control instruction, and the infrared transmitting module uses the first control instruction to transmit an infrared signal to control the controlled device.

10. The remote control system as claimed in claim 9, wherein the first transmission module downloads the first control instruction via a Wi-Fi network environment.

11. The remote control system as claimed in claim 9, wherein the first control instruction comprises a header code and a body code, and after the first processing module divides the body code, it uses the header code and the divided body code to generate the plurality of transmission codes.

12. The remote control system as claimed in claim 11, wherein the first processing module sets the second control instruction including a part of the header code.

13. The remote control system as claimed in claim 10, wherein the mesh network control device and the infrared control device are connected to an other mesh network control device, such that the second control instruction is transmitted to the other mesh network control device and then to the infrared control device.

14. The remote control system as claimed in claim 13, wherein the second control instruction is stored to the other mesh network control device.

15. The remote control system as claimed in claim 9, wherein the mesh network control device and the infrared control device are connected to an other infrared control device, such that the second control instruction is transmitted to the other infrared control device and then to the infrared control device.

16. The remote control system as claimed in claim 15, wherein the first control instruction is stored to the other infrared control device.

\* \* \* \* \*